3,098,828
CATALYST PREPARED BY GRINDING ZIRCONIUM AND ALUMINUM CHLORIDE
Gaetano F. D'Alelio, South Bend, Ind., assignor, by direct and mesne assignments, to Dal Mon Research Co., Cleveland, Ohio, a corporation of Delaware
No Drawing. Filed Nov. 4, 1957, Ser. No. 694,104
4 Claims. (Cl. 252—442)

The present invention is directed to polymerizing olefins such as ethylene, propylene, butylene, styrene, butadiene, isoprene and the like in an inert solvent in the presence of a catalyst prepared by grinding under inert conditions a mixture consisting essentially of zirconium metal and $AlCl_3$.

It is known to prepare a catalyst for the polymerization of ethylene by ball milling together a mixture of Al and $TiCl_3$, followed by heating the result at 200° C. for 18 hours, thereby giving a product comprising essentially $TiCl_2$. This procedure is disclosed in French Patent 1,132,506 to Bayer (Example 9). This same patent also discloses ball milling all or part of the product obtained by heating Al powder and $TiCl_4$ at high temperatures to give a catalyst that will polymerize ethylene. (See Examples 6 and 11 of the patent.) The product that is ball-milled in Example 6 is said to be $TiCl_2$, Ti, and Al, possibly with some $TiCl_3$, and in Example 11 apparently it is Ti, Al, $TiCl_2$, $TiCl_3$, and $AlCl_3$. It is also known that a catalyst for the polymerization of ethylene may be prepared by heating at high temperatures, mixtures of Al and $ZrCl_4$; or Ti and $ZrCl_4$; $ZrCl_4$ and Na; or $ZrCl_3$, $TiCl_4$ and Al.

My invention differs from the Bayer technique in that I have discovered that the product obtained by grinding together only Zr metal and $AlCl_3$ can be used directly as an ethylene-polymerization catalyst, without the inclusion of a heating step in the catalyst preparation, and without any Al, $TiCl_2$, $TiCl_3$, $ZrCl_3$ and $ZrCl_2$ being added as such.

The following examples illustrates without limiting the invention.

*Example 1*

Ten grams of granulated Zr sponge and 1 g. $AlCl_3$ are ground as a suspension in 40 ml. toluene for 30 hours in a conventional stainless steel ball mill of 4 ounce capacity loaded to approximately one-half its bulk volume with ½ inch stainless steel balls. The charge is washed with 40 ml. additional toluene through a ¼ inch stainless steel screen situated in a dry box and into a 200 cc. stainless steel bomb. The transfer is made in a dry box maintained under a slight pressure of nitrogen to avoid contamination with moisture, oxygen, and the like. Since the catalyst is extremely sensitive to such contaminants it therefore should always be handled under inert conditions. The bomb is closed, pressurized with ethylene to about 500 p.s.i., and heated to a temperature of about 125° C. During the polymerization reaction frequent repressurizing with ethylene is necessary to maintain the aforesaid pressure. After 12 hours the polymerization reaction is terminated. The bomb is cooled and vented and upon opening a good yield of solid polyethylene is obtained (50 gm.). Substitution for the ethylene by propylene, butene-1, pentene-1, hexene-1, styrene, paramethylstyrene, butadiene, isoprene, vinyl cyclohexene and like olefins containing a terminal $CH_2=CH-$ grouping produces the corresponding polymers whereas mixtures of such olefins produce copolymers. The catalysts of this invention may be used in conjunction with alkyl metals such as butyllithium, cyclohexyllithium, etc. to produce cis polymers of isoprene.

The catalyst as above prepared is useful in polymerizing ethylene and other olefins at temperatures ranging from about room temperature up to about 200° C., and even higher, and at pressures ranging from a few atmospheres, for example 100 p.s.i., to pressures as high as 10,000 p.s.i., and even higher. For practical operation, however, temperatures in the range of 50–200° C., and pressures of 150–1000 p.s.i. are suitable.

Ethylene polymerization is ordinarily performed in 2–48 hours. However longer periods, e.g., 4 days or more, may be utilized. Generally, if sufficient catalyst is present, a longer polymerization period will result in greater polymer yields.

The polymerization reaction is suitably carried out in an inert solvent. Hydrocarbon solvents free from contaminants (especially free from oxygen and oxygen-containing compounds) are preferred. Among the suitable solvents are pentane, hexane, heptane, cyclohexane, octane, benzene, xylene, toluene, and the like.

The amount of catalyst is not critical. Relatively small amounts are operable to form relatively large amounts of polymer. In general, a practical range is 0.001 to 1 g. of catalyst per gram of ethylene polymerized. Even larger amounts are operable, but not necessary.

Any grinding or milling whatever of a mixture consisting essentially of Zr and $AlCl_3$ will provide a catalyst of some activity. Preferably, however, the milling or grinding should be conducted for a number of hours, and suitably for at least 1 day. The Zr:$AlCl_3$ weight ratio can vary considerably, e.g., from 1 Zr:100 $AlCl_3$ to 100 Zr:1 $AlCl_3$. The Zr can be charged to the mill as pieces, granules, powder, or the like.

In conducting the grinding operation it is often convenient to wet grind, as above disclosed. For example, a hydrocarbon may be added to the mixture to be ball milled. The hydrocarbon is used is preferably one that will not interfere with the subsequent polymerization reaction. Solvents suitable for use in the polymerization reaction as above described are in general suitable for "wet" ball milling. The use of such a hydrocarbon in the mill-milling step provides a slurry of the catalyst in an inert medium which is easily handled. If the mixture is dry ground it should be done under an inert atmosphere such as pure dry nitrogen or a noble gas. The resultant milled mixture is extremely pyrophoric and should be handled under an inert atmosphere. If desired the mixture can be dry ground under an inert atmosphere of nitrogen or one of the noble gas or the like, and then the milled mixture can be flushed from the mill with an inert hydrocarbon. Similarly, the milling can be carried out partly by dry grinding in an inert atmosphere and then an inert hydrocarbon can be added to the mill toward the end of the milling in order to slurry the product for ease of handling.

The polyolefins and the polyethylene obtained by practice of this invention can be used in any conventional manner now being used by polyolefins formed by prior art procedures. Such uses include film, molding, pipe, tubing, filament, extruded articles and the like.

I claim:

1. The method of preparing a catalyst suitable for the polymerization of olefins, which comprises the step of grinding at room temperature and at ambient temperatures under inert conditions a mixture consisting essentially of Zr and $AlCl_3$ in the ratio of 1–100 parts by weight of Zr to 1–100 parts by weight of $AlCl_3$.

2. The method according to claim 1 in which the mixture is ball-milled for at least 1 day.

3. The method according to claim 1 in which the grinding is done in an inert atmosphere.

4. The method according to claim 1 in which the grinding is done in an inert hydrocarbon liquid.

References Cited in the file of this patent

UNITED STATES PATENTS

| 2,608,464 | Aagaard et al. | Aug. 26, 1952 |
| 2,703,794 | Roedel | Mar. 8, 1955 |
| 2,816,817 | Stein et al. | Dec. 17, 1957 |

FOREIGN PATENTS

| 874,215 | Germany | Apr. 20, 1953 |
| 1,132,506 | France | Nov. 5, 1956 |
| 1,007,999 | Germany | May 9, 1957 |